United States Patent
Stalnaker et al.

(10) Patent No.: US 11,858,299 B2
(45) Date of Patent: Jan. 2, 2024

(54) EFFECTIVE TIRE PRESSURE SENSING SYSTEM AND METHOD

(71) Applicant: Bridgestone Americas Tire Operations, LLC, Nashville, TN (US)

(72) Inventors: David O. Stalnaker, Brentwood, TN (US); Robert Palmer, Murfreesboro, TN (US); Kirk S. Rutherford, Hendersonville, TN (US); Cameron C. Martinez, Nashville, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 326 days.

(21) Appl. No.: 17/311,181

(22) PCT Filed: Feb. 12, 2020

(86) PCT No.: PCT/US2020/017927
§ 371 (c)(1),
(2) Date: Jun. 4, 2021

(87) PCT Pub. No.: WO2020/190430
PCT Pub. Date: Sep. 24, 2020

(65) Prior Publication Data
US 2021/0402832 A1 Dec. 30, 2021

Related U.S. Application Data

(60) Provisional application No. 62/821,258, filed on Mar. 20, 2019.

(51) Int. Cl.
*B60C 23/04* (2006.01)
*B60C 23/00* (2006.01)
*B60S 5/04* (2006.01)

(52) U.S. Cl.
CPC ........ *B60C 23/0486* (2013.01); *B60C 23/002* (2013.01); *B60C 23/0479* (2013.01)

(58) Field of Classification Search
CPC . B60C 23/04; B60C 23/0476; B60C 23/0479; B60S 5/046
See application file for complete search history.

(56) References Cited

U.S. PATENT DOCUMENTS 4,909,074 A    3/1990  Gerresheim
6,518,877 B1 *  2/2003  Starkey ................ B60C 23/131
                                                340/447
(Continued)

FOREIGN PATENT DOCUMENTS

CN       1750950 A     3/2006
CN     201325292 Y    10/2009
(Continued)

OTHER PUBLICATIONS

International Searching Authority: Supplementary European Search Report for European Application No. EP 20 77 4322 dated Sep. 30, 2022.
(Continued)

*Primary Examiner* — Tan Q Nguyen

(57) ABSTRACT

A real time tire pressure sensing system includes sensors to collectively generate signals corresponding to a contained tire air temperature, a contained inflation pressure, and an ambient temperature associated with a tire mounted on a vehicle. A processor determines an effective tire inflation pressure based on the generated signals and further at least on a calculated moving average of the ambient temperature (e.g., over a defined time period such as 24 hours) and generates real time notifications associated with the determined effective tire inflation pressure to specified user interfaces. At least one sensor may be an inflation pressure sensor configured to generate event-based signals corre-
(Continued)

sponding to detected changes per unit pressure. The processor may further generate real time feedback control signals to an automatic tire inflation device, based on the determined effective tire inflation pressure, or enable and prompt manual control of the tire inflation device via the user interface.

17 Claims, 5 Drawing Sheets

(56) References Cited

U.S. PATENT DOCUMENTS

| | | | |
|---|---|---|---|
| 2005/0007245 A1* | 1/2005 | Smith | B60C 23/0408 |
| | | | 340/442 |
| 2007/0113635 A1 | 5/2007 | Corniot | |
| 2008/0024287 A1 | 1/2008 | Boyle et al. | |
| 2008/0042817 A1* | 2/2008 | Fogelstrom | B60C 23/009 |
| | | | 340/442 |
| 2011/0107828 A1* | 5/2011 | Kawasaki | B60C 23/061 |
| | | | 73/146.2 |
| 2015/0005982 A1* | 1/2015 | Muthukumar | B60T 8/1725 |
| | | | 701/1 |
| 2017/0217261 A1* | 8/2017 | Mays | B60C 23/0486 |
| 2018/0117975 A1 | 5/2018 | Choi | |
| 2018/0022169 A1 | 6/2018 | Surendra | |

FOREIGN PATENT DOCUMENTS

| | | |
|---|---|---|
| CN | 106314047 A | 1/2017 |
| EP | 21423891 A | 1/2010 |
| FR | 2833524 A1 | 6/2003 |
| JP | 2003246211 A | 9/2003 |
| JP | 2007083766 A | 4/2007 |
| JP | 2007513014 A | 5/2007 |
| JP | 2008052660 A | 3/2008 |
| JP | 2009234298 A | 10/2009 |
| JP | 2012131381 A | 7/2012 |
| JP | 2017102849 A | 6/2017 |
| WO | WO0160644 A1 | 8/2001 |
| WO | 2009036547 A1 | 3/2009 |

OTHER PUBLICATIONS

International Searching Authority: International Search Report for corresponding International Patent Application No. PCT/US2020/017927 dated Jun. 24, 2020, 5 pages.

Japan Patent Office: Notice of Reasons for Rejection (Office Action) for corresponding JP Application No. 2021-556347 dated Jul. 1, 2022.

* cited by examiner

EFFECTIVE TIRE PRESSURE SENSING SYSTEM AND METHOD

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

The present invention relates generally to tire pressure monitoring systems and methods for wheeled vehicles. More particularly, the present invention relates to tire pressure monitoring systems including sensors and data processors configured to generate an "effective" tire pressure in real time for wheeled vehicles including but not limited to motorcycles, consumer vehicles (e.g., passenger and light truck), commercial and off-road (OTR) vehicles.

Proper maintenance of tire inflation pressures is critical for highway safety, optimized tire wear, traction and fuel economy. Particularly with respect to commercial vehicles, most experts agree that pressures should be checked periodically and maintained within 5 psi of the target recommendations. For example, if dual tires are mismatched by more than the aforementioned 5 psi, it has been observed that they may subsequently differ in deflection and result in increased and irregular wear on one or more of the tires and overloading of the higher-pressure tire.

The contained air temperature of a tire has a significant impact on its inflation pressure, which accordingly must be set when it is "cold", i.e., when the tire is at ambient temperature conditions, i.e., wherein the tire casing, air in its respective cavity, and the surrounding ambient environment are all in equilibrium. More particularly with respect to commercial vehicles, the inflation pressure must be set when ambient temperature conditions have been maintained for three hours, and a value for which is further specified with respect to a given load condition. A "hot" tire typically is 50-60° F. above ambient temperature, leading to pressure increases of 10-15 psi above the cold inflation pressure. Even when tire inflation pressures are properly set, ambient temperatures often change by 30-40° F. over the course of a day, again leading to large daily fluctuations in inflation. Referring for example to U.S. Patent Application Publication No. 2006/0149688 entitled "Method for Predicting Tire Life Cycle Cost," annual fuel savings alone can amount to $680-$1530 per long-haul commercial vehicle for proper tire inflation pressures as opposed to tire inflation pressures that are 10-20 psi low.

To properly calculate the cold inflation pressure for a tire, both the ambient temperature and the tire contained air temperature are critical and must be obtained. If the tire contained air temperature is equal to the ambient temperature, of course the tire can be easily set to a recommended cold inflation pressure value without reference to a chart or other calculations. However, for all other cases it is necessary to make such calculations, for which conventional systems have demonstrated problems even with the integration of tire pressure monitoring systems (TPMS).

An example of a conventional TPMS includes a sensor transmitter functionally linked to a TPMS receiver, itself further linked to a data processing unit. The TPMS sensor transmitter may be provided in the interior air cavity of each tire of a vehicle on either a tire wheel or an inner surface of the tire. The transmitter detects an internal pressure of the tire at a predetermined time interval, and wirelessly transmits an internal pressure value of the tire along with a unique identifier associated with the tire to the receiver. The transmitter may for example be mounted on a wheel rim so as to be integral with a tire valve. Alternatively, the transmitter may be attached to an inner surface of the tire. The receiver further relays the signals from the transmitter to the data processing unit via a communication means such as for example Bluetooth.

One exemplary data processing implementation of TPMS calculates cold inflation pressure using a fixed cold or reference temperature of 65° F., which obviously is rarely going to be a correct condition and can undesirably lead to under-inflated tires, particularly in colder climates.

Another exemplary TPMS system provides a post-processing cold inflation pressure calculation using ambient temperatures obtained from a weather station based on location. This is a correct method, with the caveat that ambient temperatures from a weather station can also be misleading especially when there are substantial amounts of solar radiation and associated ground/pavement heat. Also, use of weather station-based ambient temperature information requires cellular communications, thereby substantially preventing real-time, standalone implementation.

No conventional TPMS systems offer more realistic, effective values of the local temperature, instantaneously measured at or otherwise in association with current positions of the truck.

No conventional systems offer the driver the ability to see his inflations on a hand-held device and to also automatically or manually actuate tire inflation using the same device.

BRIEF SUMMARY

Systems and methods as disclosed herein may address the almost impossible situation of the truck driver who is trying to maintain proper inflations, desirably eliminating the need to check or set inflations when the tire is cold, and thereby allowing the driver to perform tire checks during a quick stop or even to visually obtain effective inflation pressures in real-time. Exemplary systems and methods as disclosed herein may include one or more external valve-stem TPMS sensors and an electronic control unit/firmware that permit a vehicle user (driver, mechanic, or the like) to check and potentially adjust the tires' effective inflation pressures regardless of a thermal state of the tires, inherently without the need for a pressure gage and without the need to let tires cool to ambient temperature. An invention as disclosed herein thereby addresses existing problems for applications wherein the required cooling time (e.g., three hours for commercial vehicles, even longer for OTR vehicles), is difficult or impossible to practically achieve. As previously noted, long-haul commercial vehicles with team drivers, with more continuous autonomous applications, or OTR 24-hour mining applications do not frequently park or otherwise disable operations long enough to achieve a necessarily complete cool-down.

In one aspect, a "real" or "effective" tire inflation pressure can be calculated as opposed to the conventional "cold" inflation pressure that is impractical and difficult to achieve, especially for long haul truckers that are seldom sitting in one location for three hours. An exemplary calculation method as disclosed herein uses a moving average of the ambient temperature measured specifically with respect to the vehicle, so that if the vehicle travels from one geographic area to another, it is reflected in the moving average.

The effective inflation pressure as disclosed herein may also obtain and take advantage of changes in atmospheric pressure that occur due to weather changes and altitude.

The effective inflation pressure as disclosed herein may also account for the simplifying assumption that a tire is essentially a constant volume container over the range of inflation pressures of concern. This makes it possible to perform the calculation without an a priori knowledge of the tire size or construction.

The effective tire inflation pressure calculations can be used to alert a driver (and/or a remotely located fleet maintenance supervisor) when there is a low-pressure condition, even when the vehicle is in operation. It is possible for the "hot" inflation pressure to be higher than the recommended target pressure and the tire to be underinflated.

The effective tire inflation pressure calculations can be used in conjunction with a wireless app for monitoring and enabling manual actuation for inflating the tire, regardless of the tire temperature, and without the need for a pressure gage.

The effective tire inflation pressure calculations can also or in the alternative be used to supply a command signal to an automatic inflation system, again allowing it to keep the tires inflated properly, regardless of the tire's temperature.

In a particular embodiment, a method for providing real-time tire pressure information as disclosed herein may comprise collecting input values from one or more sensors, the values corresponding to each of a contained tire air temperature, a contained tire inflation pressure, and an ambient temperature associated with a tire mounted on a vehicle. The method further comprises determining an effective tire inflation pressure based on the generated signals and further at least on a calculated moving average of the ambient temperature, and generating real-time notifications associated with the determined effective tire inflation pressure to a specified user interface via a communications network.

The generated real-time notifications may comprise hot inflation pressure values and cold inflation pressure values, and may further comprise effective inflation pressure values, tire temperature values, and measured deviations from target values.

The user interface may be generated on a display unit for a mobile user computing device. The user interface may in addition or alternatively be generated on one or more display units fixedly mounted for example in association with a driver seat, control panel, proximate a manual actuator for a tire inflation device, etc.

In one exemplary aspect of the above-referenced embodiment, the effective tire inflation pressure may be determined based on the generated signals and further at least on a calculated moving average of the ambient temperature over a defined time period. The defined time period may be substantially twenty-four hours.

In another exemplary aspect of the above-referenced embodiment, the effective tire inflation pressure may be determined based on the generated signals and further at least on a calculated moving average of the ambient temperature over a defined distance as opposed to a time-based moving average, for example to provide more weight to values when the vehicle is moving rapidly or across disparate regions as opposed to when it is parked, static or otherwise highly localized.

In another exemplary aspect of the above-referenced embodiment, locations of the vehicle may be determined based on output signals from a global positioning system sensor associated with the vehicle. The method further comprises, via at least a communications network, collecting ambient temperature data corresponding with the determined locations from an online weather service, and calculating a moving average of the ambient temperature data from the online weather service.

The effective tire inflation pressure may be determined based on the generated signals and further at least in part based on a forward weighted moving average of the ambient temperature data.

Another exemplary aspect of the above-referenced embodiment may include providing, for at least one of the one or more sensors, a tire inflation pressure sensor configured to generate event-based signals corresponding to detected changes per unit pressure. This may enable the user to adjust the tire inflation and receive feedback on a per unit (e.g., psi) basis or otherwise to receive warning as to abnormal operating conditions such as for example when a tire is going flat.

Correspondingly, the generated real time notifications may be event-based for detected changes in the ambient temperature, contained tire air temperature, and/or contained tire inflation pressure resulting in a change to the determined effective tire inflation pressure.

In another exemplary aspect of the above-referenced embodiment, real-time feedback control signals may be generated to an automatic tire inflation device, based on the determined effective tire inflation pressure.

Another exemplary aspect of the above-referenced embodiment may comprise enabling, via the specified user interface, one or more selectable actuators in response to certain generated real time notifications from the computing device. Upon user selection of one or more generated actuators, corresponding feedback control signals may be provided to an automatic tire inflation device.

In another exemplary aspect of the above-referenced embodiment, at least one of the sensors comprises a controller area network (CAN) bus sensor configured to generate signals corresponding to the ambient temperature and/or an ambient barometric pressure.

In addition or alternatively, at least one of the sensors may comprise a tire pressure monitoring system (TPMS) sensor mounted in association with the vehicle and configured to generate signals corresponding at least to the ambient temperature.

In an embodiment of a system for providing real-time tire pressure information as disclosed herein, one or more sensors are collectively configured to generate signals corresponding to each of a contained tire air temperature, a contained tire inflation pressure, and an ambient temperature associated with a tire mounted on a vehicle. An onboard computing device functionally linked to the one or more sensors and configured to perform steps according to any one of the method embodiments described above.

The computing device may be part of a distributed vehicle data collection and control system.

The computing device may alternatively be part of a central vehicle data collection and control system.

The computing device may be configured to receive programming information from a remote server and/or the specified user interface, wherein the programming information comprises unique identifiers for at least one of the one or more sensors, and/or a tire position of at least one of the one or more sensors, and/or a reference tire pressure.

The computing device may be configured to compare the effective tire inflation pressure to the reference tire pressure, and to illuminate an indicator light as part of the central vehicle data collection and control system.

In an alternative embodiment as disclosed herein, a system for providing real-time tire pressure information for each of a plurality of vehicles in a managed fleet may comprise a server in operative communication via respective communications networks with a mobile user device application and/or computing devices mounted onboard the respective plurality of vehicles. For each of the respective vehicles, one or more sensors are collectively configured to generate signals corresponding to each of a contained tire air temperature, a contained tire inflation pressure, and an ambient temperature associated with a tire mounted on a vehicle. The respective mobile application and/or vehicle-mounted onboard computing device is functionally linked to the one or more sensors and configured to perform steps according to any one of the method embodiments described above.

The server may be configured to receive at least effective tire inflation values in real time from each of the respective mobile applications and/or onboard computing devices, and further to generate alarms on a fleet management device linked to the server where one or more monitored values exceed an allowable value and/or range.

BRIEF DESCRIPTION OF THE SEVERAL VIEWS OF THE DRAWINGS

Hereinafter, embodiments of the invention are illustrated in more detail with reference to the drawings.

DETAILED DESCRIPTION

Figure 1:
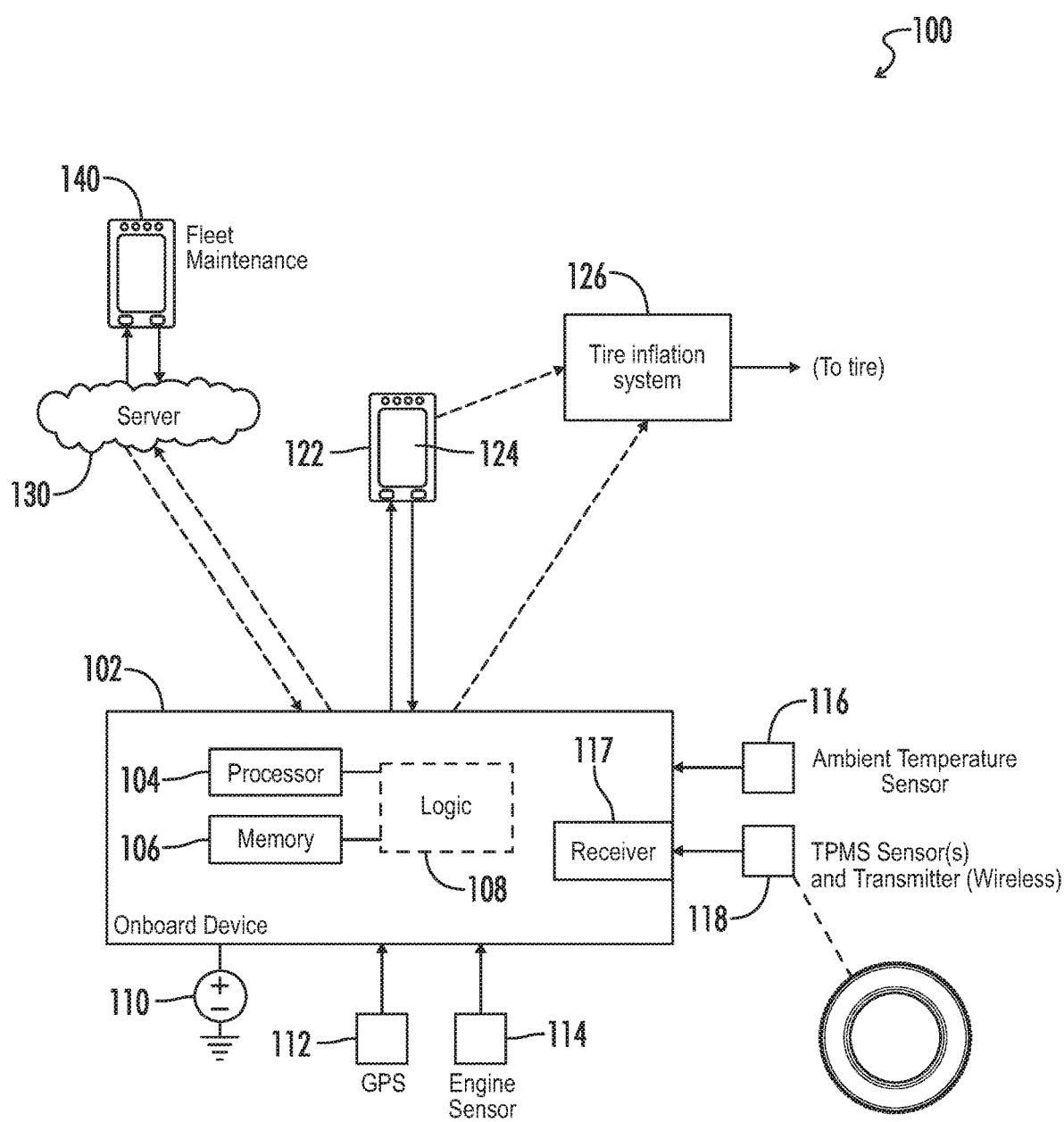
FIG. 1 is a block diagram representing an exemplary tire pressure monitoring system as disclosed herein.

Referring generally to the aforementioned figures, various exemplary embodiments of an invention may now be described in detail. Where the various figures may describe embodiments sharing various common elements and features with other embodiments, similar elements and features are given the same reference numerals and redundant description thereof may be omitted below.

Referring initially to FIG. 1, an exemplary embodiment of a system 100 as disclosed herein includes a computing device 102 that is onboard a vehicle and configured to at least obtain data and perform relevant computations as disclosed herein. The computing device may be portable or otherwise modular as part of a distributed vehicle data collection and control system (as shown), or otherwise may be integrally provided with respect to a central vehicle data collection control system (not shown). The device may include a processor 104 and memory 106 having program logic 108 residing thereon. One or more TPMS sensors 118 are provided, otherwise similar to TPMS sensors as are conventionally known in the art but as disclosed herein having reporting logic that may in a particular embodiment be modified for read outs of 1 psi or less as further described below, and which also measure tire contained air temperature (i.e., the temperature of the air in the tire cavity). The illustrated embodiment further includes an ambient temperature sensor 116, an engine sensor 114 configured for example to provide sensed barometric pressure signals, a position sensor 112 such as a global positioning system (GPS) device or the like, and a DC power source 110. The system may further include distributed program logic such as for example a smartphone app 122 residing on a mobile user computing device and executable to generate a user interface 124 for real-time accurate pressure display or associated real time notifications (e.g., via a visual and/or audio indicator), with the user device being functionally linked to the onboard device via a communications network 120. System programming information may be provided on-board by the driver or from a fleet manager, and may include for example unique identifiers for one or more sensors, a tire position for one or more of the sensors, and a reference (or target) tire pressure.

Effective tire inflation pressure calculations as disclosed herein can be provided to the wireless app 122 on the (for example) WiFi or Bluetooth enabled mobile device for user monitoring and manual actuation (via user interface 124) of inflation/deflation of the tire, regardless of the tire temperature, and without the need for a pressure gage. Additionally, or in the alternative, command signals may be provided by the onboard device 102 directly to a tire inflation system 126 for automatic actuation of inflation/deflation of the tire.

The effective tire inflation pressure measurements may be provided to a central control module for the vehicle, wherein for example an indicator light may be illuminated on the vehicle's dashboard in addition to (or alternatively to) the wireless communications with a mobile device.

In an exemplary embodiment, a system as disclosed herein includes TPMS sensors 118 having reporting logic that is modified to report event-based changes to approach predetermined and discrete levels, such as for example changes in tire inflation pressure corresponding to each 1 psi. One of skill in the art may appreciate that conventional TPMS sensors report at fixed intervals of time, often in intervals of five to ten minutes to prolong battery life. For various embodiments of a TPMS sensor as disclosed herein, the reporting logic would be changed from 'per unit time' to a 'per unit pressure'. If the pressure changed by more than, for example, 1 psi, the sensor would report immediately. If the pressure does not sufficiently change, it does not use up battery life by reporting needlessly. The change in tire inflation pressure is the important metric in such an example, wherein when the user is in the process of inflating a tire the sensor would report with each 1 psi increase in pressure, which would be picked up by the TPMS RF receiver 117 and reported back to the firmware logic processor 108, which would further calculate the effective tire inflation pressure and report it in real-time to the driver's mobile device for display or other action.

A case study was performed by the inventors wherein actual time-based sensor data was retrieved and back-calculations were implemented to determine how often an event-based sensor as disclosed above would have transmitted in the same time period. The case study was based on two months of time-based data at five-minute intervals from a super-regional semi-truck. Over 90,078 minutes, the time-based TPMS data produced 18,001 readings. Calculations according to the case study determined that an event-based TPMS operating at a 1 psi interval over the same time period would have recorded 2,323 times for the right front steer tire and 2,501 times for the left front steer tire, and from 1,073 to 1,626 times for the eight drive tires. In other words, the number of sensor transmissions would have been reduced to approximately 12-14% of the time-based transmissions for steer tires and approximately 6-9% of the time-based transmissions for drive tires. Those of skill in the art will readily appreciate the benefits of extending battery life many times over the conventional five-minute transmissions.

In addition, the inventors noted from the results of the case study that the 1 psi event-based readings fully describe areas of rapidly changing pressures. Accordingly, another advantage is that for very rapid changes in pressure, e.g., a loss of inflation due to a road hazard or an increase in inflation due to adding air, the event-based sensor as disclosed herein would more fully describe the event.

The TPMS sensors may in an embodiment further be provided with unique identifiers, wherein the onboard device processor can distinguish between signals provided from respective TPMS sensors on the same vehicle, and further in certain embodiments wherein a central fleet management server 130 and/or fleet maintenance supervisor client device 140 may distinguish between signals provided from tires and associated TPMS sensors across a plurality of vehicles. The onboard device processor may communicate directly with the fleet management server as shown in FIG. 1, or alternatively the driver's mobile device or truck-mounted computing device with app 122 may be configured to transmit onboard device output data to the fleet management server and/or client device.

Signals received from a particular TPMS sensor may be stored in onboard device memory, or an equivalent data storage unit functionally linked to the onboard device processor, for selective retrieval as needed for calculations according to the method disclosed herein. As previously noted, the TPMS sensor may preferably be configured to produce output signals corresponding only to detected changes in the tire contained inflation pressure, wherein the last received value for the contained inflation pressure is further preferably maintained in retrievable form for subsequent calculations even if the monitored value does not change.

Figure 2:
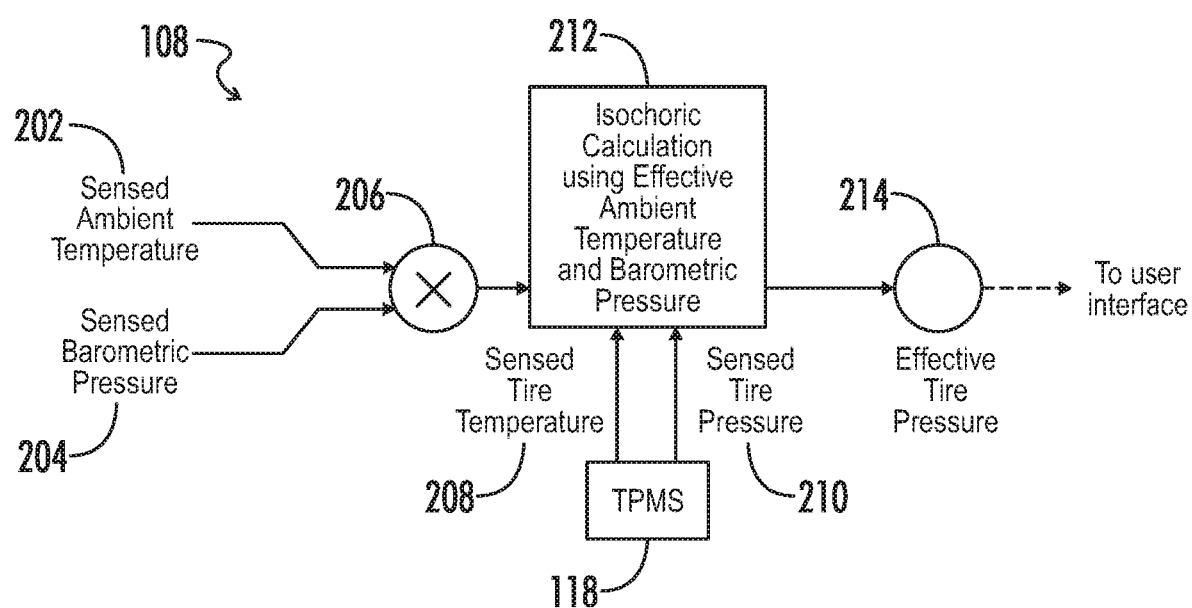
FIG. 2 is a block diagram representing an exemplary programmed logic for determining the effective tire pressure according to a system as disclosed herein.

Referring next to FIG. 2, an embodiment of the firmware logic 108 as disclosed herein is provided to generate an effective tire pressure measurement 214 to the user interface 124. The logic obtains instantaneous values for the sensed ambient temperature 202 and the sensed barometric pressure 204, which may for example be stored in memory and selectively retrieved, and calculates effective values 206 for both, or at least the sensed ambient temperature, for example as moving averages over a defined period of time. In a preferred embodiment, the moving averages are determined over 24 hours. While the aforementioned 24-hour period may typically consist of data captured locally over the previous day, in an alternative embodiment the moving average may incorporate not only sensed ambient measurements over a previous time period but may further encompass expected ambient temperatures to be encountered in an upcoming time period. Many trucks for example will travel based on a fixed route for which ambient temperatures may be forecast with reasonable accuracy, and values for which may optionally be input to the algorithm if sufficient communications with for example the fleet management server or a third-party weather service provider are available. The algorithm-based, effective values (e.g., moving averages) are combined with sensed values for the tire's contained air temperature 208 and the contained tire inflation pressure 210 as obtained from one or more TPMS sensors 118, and applied in a program block 212 for calculation of an isochoric tire pressure value, with respect to the Ideal Gas Law.

One of skill in the art will readily appreciate that the Ideal Gas Law is represented as: PV=nRT, wherein: P=absolute pressure as measured in Pascals; V=volume as measured in cubic meters; n=moles; R=ideal gas constant, or 8.314 N m/mol K; and T=temperature. When comparing two thermal states of the same gas in a fixed volume (e.g., in a rigid tire casing), V1=V2, the equation simplifies to:

$$\frac{P_1}{T_1} = \frac{P_2}{T_2}$$

Where P is absolute pressure and T is absolute temperature. We may further assume a thermal state 1 to be the reference or 'cold' state where the tire casing, the contained air temperature and the ambient air temperature are all at equilibrium, and a thermal state 2 to be an arbitrary 'hot' state where the tire casing, the contained air temperature and the ambient air temperature may be at different values. By putting P in psi and in terms of gage pressure, putting T in ° F., and solving for an effective tire inflation pressure $P_{eff}$, the resultant equation yields:

$$Peff = \frac{(Teff + 460)(Phot + Patm)}{(Tcat + 460)} - Patm$$

Where: $P_{eff}$ represents an effective value with respect to instantaneous value $P_{cold}$ as described below; and $T_{eff}$ represents an effective value with respect to instantaneous value $T_{amb}$ as described below.

Pcold ($psi_g$) is the predetermined inflation pressure for a given application, as recommended to safely carry the associated load. This is also known as the target pressure, in gage pressure. The target pressure may change based on tire load and may be set (manually or automatically) based on the axle load. In certain embodiments the payload for the vehicle may be at least periodically measured for this purpose and provided by one or more dedicated sensors (not shown). The target pressure may further be determined based at least in part on a predetermined pressure-load curve corresponding to the tire size. The target pressure may further be defined based at least in part on a type of road surface to be driven upon, and/or a speed of the vehicle, as for example a lower target pressure is sufficient for slower speeds. The target pressure can only be measured when the tire is completely cool; when the tire casing, its contained air, and the surrounding ambient temperature are equal. If the vehicle has been in operation, especially at highway speeds, it could take up to three hours to cool.

$P_{atm}$ (psig) is the atmospheric pressure and can be obtained from an internal sensor, or otherwise approximated by a value of 14.7 psi. Pressure can change by for example ½ to 1 psi due to weather conditions, and ½ psi per 1000 ft of altitude. These effects can also be managed in a like manner as disclosed herein.

$T_{CAT}$ (° F.) is the contained air temperature or the temperature of the air in the tire cavity. $T_{CAT}$ and $P_{hot}$ may be measurements from an internal TPMS sensor. Care must be taken to not mount the sensor against or near the wheel or the tire casing so that the measured temperature is truly representative of the cavity air. The 460° value is necessarily added to convert from an absolute temperature scale to the Fahrenheit scale.

Tamb (° F.) is the vehicle's instantaneous ambient or surrounding temperature and should be measured in the vicinity of the vehicle, but not in a location that would be affected by engine or brake heat. One way is to collect the vehicle's 'outside temperature' signal from its CAN bus. Alternatively, an ambient temperature sensor can be added, for example as an extra TPMS sensor, to a location on the truck that is not exposed to elevated engine, powertrain or brake heat. Yet another alternative may include, where GPS-based latitude and longitude values are available, and if there is data streaming, to collect from a weather service. For a truly perfect pressure calculation and for the purposes of this invention, $T_{eff}$ is the effective ambient temperature (e.g., as a moving average over 24 hours), and not the instantaneous ambient temperature $T_{amb}$. The ambient temperature may preferably be stored in data storage such as internal memory of the onboard device for data analysis.

Figure 3:
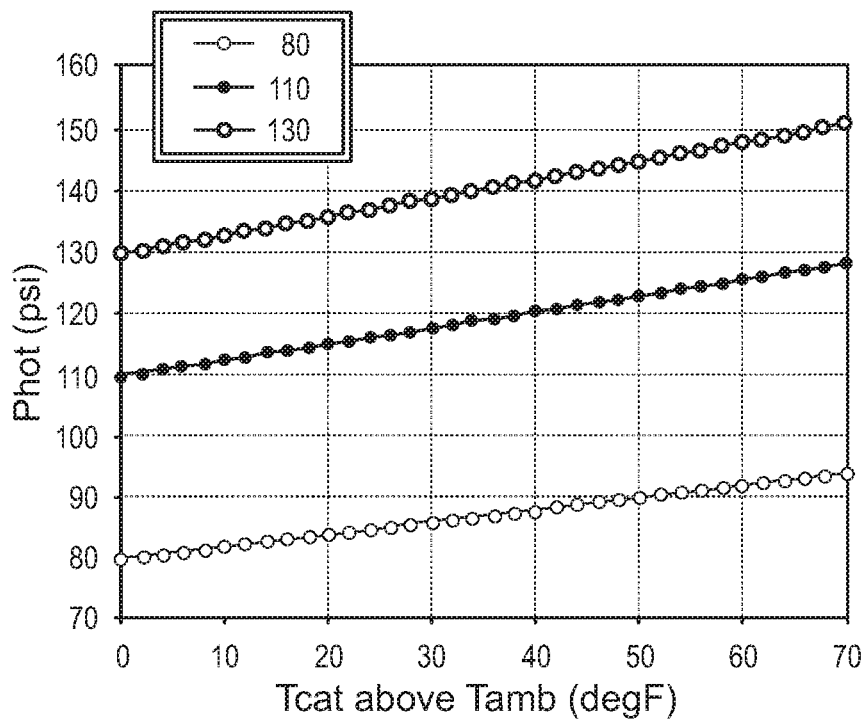
FIG. 3 is a graphical diagram representing effects of changes in tire temperature on tire inflation pressure.

FIG. 3 illustrates representative effects of tire temperature on inflation pressure. As tire contained air temperatures rise above the associated ambient temperature due to vehicle operation, tire inflation pressure also increases 1.9 psi per 10° F. rise in temperature for a tire with a starting (target or reference or cold inflation) pressure of 80 psi, 2.5 psi per 10° F. rise in temperature for a tire with a starting pressure of 110 psi, and 3.0 psi per 10° F. rise in temperature for a tire with a starting cold inflation pressure of 130 psi, or 1 psi for 36 psi passenger tire per 10° F. Steer tires in long-haul applications may typically rise 50-60° F. One of skill in the art may appreciate, at least in view of the aforementioned findings, that tires with higher pressure changes will demonstrate higher changes for corresponding changes in temperature than tires with lower target inflations. As a percentage of target pressure, the change may be 2¼ to 2½% per 10° F. in temperature change.

Figure 4:
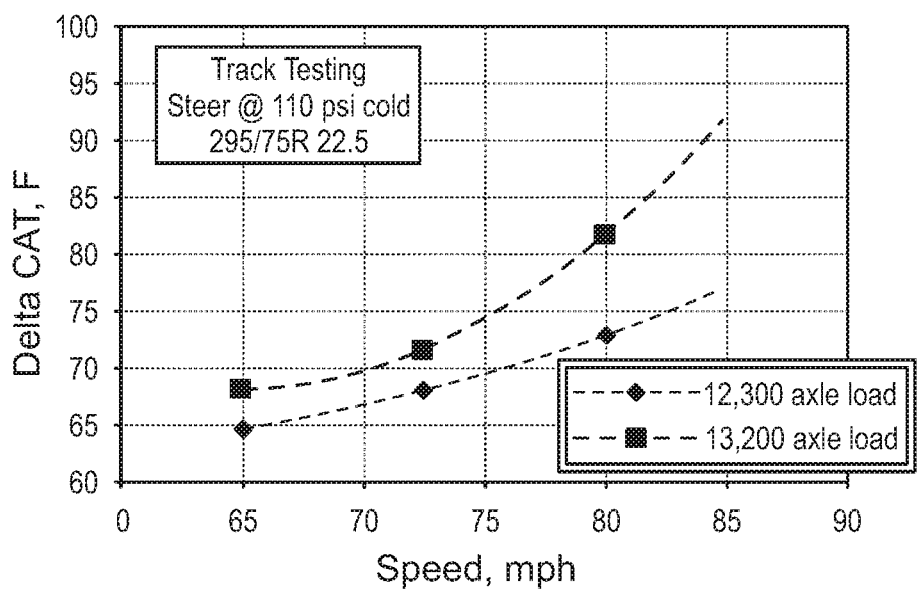
FIG. 4 is a graphical diagram representing effects of changes in operating conditions on the tire temperature.

Tire temperatures can change for many different reasons. One set of examples include vehicle operating conditions such as vehicle speed, tire load, brake heat, engine heat, and/or exhaust system heat. Another set of examples include environmental conditions such as daily temperature fluctuations, weather fronts, cross-country traveling, and/or sun loads/pavement heat. Referring to FIG. 4, the graph presented therein is an example of actual tire temperature data collected on a 295/75R22.5 steer tire at two loads: 6,150 and 6,600 lbs. Increases in load of 450 lbs (7%) increase temperatures by 4-9° F., and worse as the speed increases. Increases in tire temperatures for sustained (1 hour or more) speeds of 65-75 mph can be 65-75° F., or even higher if driven over 75 mph. Since the ambient temperature changed over the course of these measurements, the increase in tire temperature is referenced to the current ambient temperature.

Figure 5:
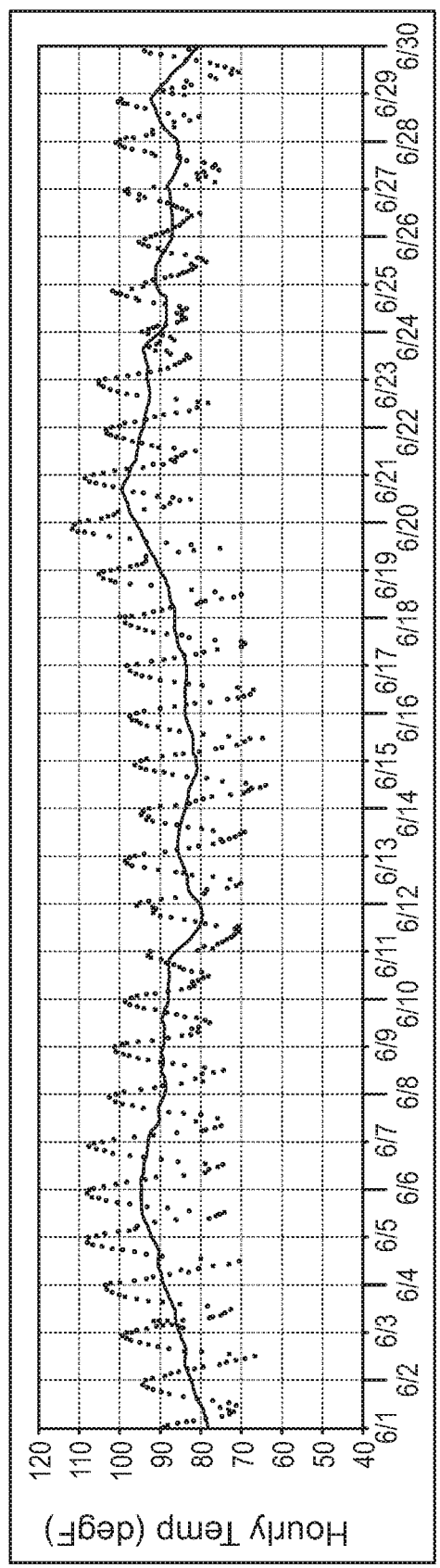
FIG. 5 is a graphical diagram representing instantaneous ambient temperature measurements overlaid with a moving average of the same.
Figure 6:
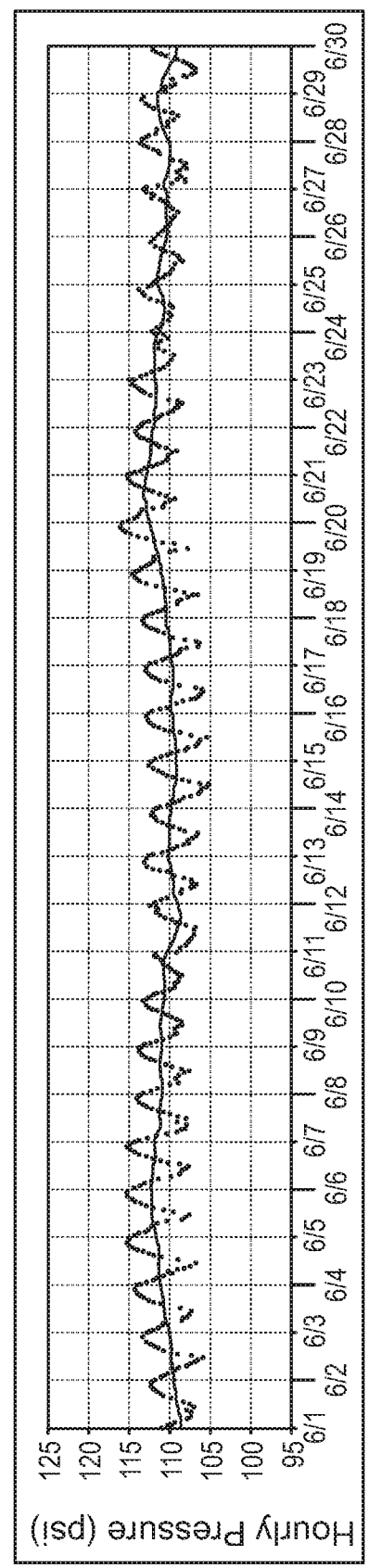
FIG. 6 is a graphical diagram representing instantaneous tire pressure measurements overlaid with a moving average of the same, for the same time frame as FIG. 5.

FIGS. 5 and 6 further illustrate the importance of implementing an effective calculation (e.g., moving average) for the sensed ambient temperature and the sensed barometric pressure as disclosed herein. In the present example as shown in FIG. 5, instantaneous ambient temperatures (in ° F.) are captured over a month in Tucson, Arizona, and plotted hourly with an overlay corresponding to a moving 24-hour average thereof. The large variations in temperature across each 24-hour period are readily apparent. FIG. 6 illustrates an example of how the cold inflation pressure varies over the course of the same month due to the ambient temperature fluctuations. If the cold inflation pressure calculation is based on a moving 24-hour average temperature, the pressure fluctuations are significantly reduced, leading to a higher level of precision.

Figure 7:
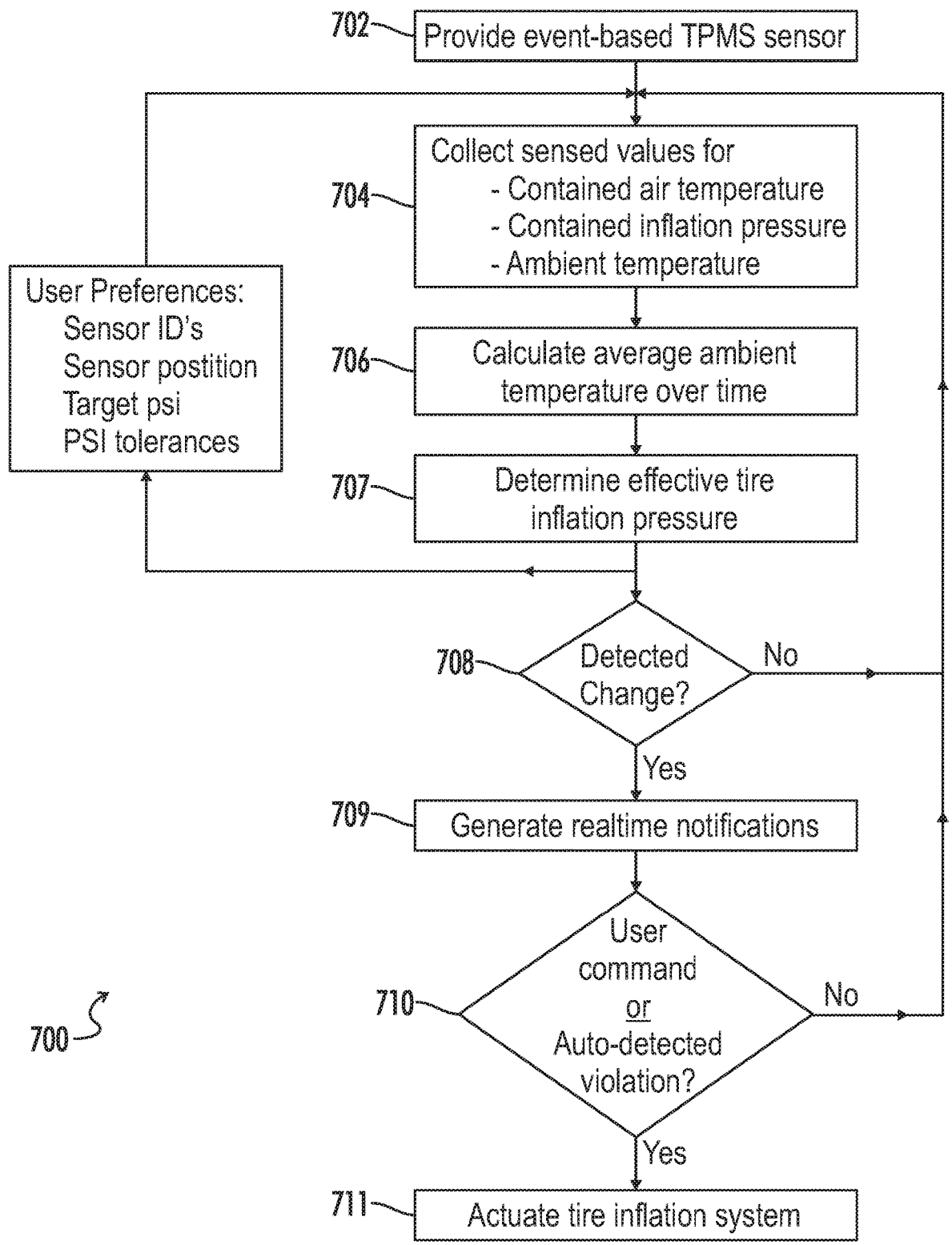
FIG. 7 is a flowchart representing an exemplary tire pressure monitoring method as disclosed herein.

In view of the preceding illustrations and discussion regarding exemplary structure, and with reference to a flowchart as shown in FIG. 7, an embodiment of a method 700 for tire pressure monitoring may now be further described. One or more TPMS sensors are provided 702, with the sensors being preferably modified to provide event-based output signals, such as for example to provide outputs based on changes corresponding to discrete levels per unit pressure. Such sensors may be distinguished from conventional TPMS sensors as previously discussed herein and which provide output signals on, e.g., a per unit time basis. The method further involves at 704 collecting input signals and/or corresponding instantaneous data relating to sensed values for a tire contained air temperature, a tire contained inflation pressure, and an ambient temperature. At least the ambient temperature may be averaged over a defined time period such as 24 hours 706.

The effective ambient temperature may be combined with the tire contained air temperature, the tire contained inflation pressure, and a barometric pressure (which may optionally be fixed or otherwise sensed and even averaged over a time period) to determine a real or "effective" tire inflation pressure according to at least the Ideal Gas Law 707. In an embodiment the effective tire inflation pressure may be continuously or periodically collected and displayed on for example a user interface. In another embodiment, the system may for each determination of the effective tire inflation pressure further compare the determined value against one or more previous values to identify violations or changes in the value over time 708. As one example, the method may involve determining whether the current effective tire inflation pressure has varied with respect to an immediately preceding calculation of the effective tire inflation pressure. As another example, the method may involve determining whether the current effective tire inflation pressure has extended beyond an acceptable range of values or is otherwise distinguished from an expected or acceptable value. In accordance with certain such examples, initial user inputs may be required so that user-specified sensor ID's are assigned to specific tire positions and specific tire inflation pressures.

If no such change or violation is detected, the method returns to step 704. If such a change or violation is detected, the method may include generating real-time notifications 709 to a user interface and/or to a central server 130 such as e.g. associated with a fleet management system. In various embodiments the method may further include data streaming even where changes are not detected, wherein calculated cold inflation values can be displayed in real-time on the local user interface and/or a remote display (e.g., associated with the fleet management server), and further displayed data may include the contained air temperature, the ambient temperature, "hot" tire inflation pressure, etc., within the scope of the present disclosure.

Where the data is streamed to or otherwise obtained by a central server, the system and method may further include obtaining such data from a plurality of devices associated with a respective plurality of vehicles. The fleet data can be processed centrally for the monitoring of tire status, and generation of alarms where one or more of the monitored conditions exceed an allowable range.

In certain embodiments, the onboard device or central control system for the vehicle may be coupled to a tire inflation system (710—"yes"). In one example, the method involves generating a user interface prompt, such as in concert with a real-time notification that the effective tire inflation pressure has changed, wherein the user can selectively issue a command signal to the tire inflation system and actuate tire inflation or deflation to correct the monitored tire inflation condition 711. In another example, the method involves automatically generating a control signal to the tire inflation system for actuating tire inflation or deflation based on the detected change or violation 711.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Whereas preferred embodiments of the present invention may typically be described herein with respect to commercial trucking applications, the invention is not expressly limited thereto and the term "vehicle" as used herein unless otherwise stated may refer to an automobile, truck, or any equivalent thereof, whether self-propelled or otherwise, as may include one or more tires and therefore require tire inflation monitoring and potential correction.

Whereas preferred embodiments of the present invention may typically be described herein with respect to onboard devices that communicate with a smartphone app associated with a driver of a commercial vehicle, the term "user" as used herein unless otherwise stated may refer to a driver, passenger, mechanic, technician, fleet management personnel, or any other person or entity as may be, e.g., associated with a device having a user interface for providing features and steps as disclosed herein.

Depending on the embodiment, certain acts, events, or functions of any processes, techniques, or algorithms as described herein can be performed in a different sequence, can be added, merged, or left out altogether (e.g., not all described acts or events are necessary for the practice of the process or algorithm).

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A method for providing real-time tire pressure information, the method comprising:
   collecting input values from one or more sensors, at least one of the one or more sensors comprising a tire inflation pressure sensor configured to generate event-based signals corresponding to detected changes per unit pressure, the collected input values corresponding to each of a contained tire air temperature, a contained tire inflation pressure, and an ambient temperature associated with a tire mounted on a vehicle;
   determining an effective tire inflation pressure based on the generated signals and further at least on a calculated moving average of the ambient temperature; and
   generating real-time notifications associated with the determined effective tire inflation pressure to a specified user interface via a communications network.

2. The method of claim 1, wherein:
the effective tire inflation pressure is determined based on the generated signals and further at least on a calculated moving average of the ambient temperature over a defined time period.

3. The method of claim 1, wherein:
the effective tire inflation pressure is determined based on the generated signals and further at least on a calculated moving average of the ambient temperature over a defined distance.

4. The method of claim 1, further comprising:
determining locations of the vehicle based on output signals from a global positioning system sensor associated with the vehicle;
via at least a communications network, collecting ambient temperature data corresponding with the determined locations from an online weather service; and
calculating a moving average of the ambient temperature data from the online weather service.

5. The method of claim 4, wherein:
the effective tire inflation pressure is determined based on the generated signals and further at least in part based on a forward weighted moving average of the ambient temperature data.

6. The method of claim 1, wherein:
the generated real time notifications are event-based for detected changes in the ambient temperature, contained tire air temperature, and/or contained tire inflation pressure resulting in a change to the determined effective tire inflation pressure.

7. The method of claim 1, further comprising:
generating real time feedback control signals to an automatic tire inflation device, based on the determined effective tire inflation pressure.

8. The method of claim 1, further comprising:
enabling, via the specified user interface, one or more selectable actuators in response to certain generated real time notifications.

9. The method of claim 8, further comprising:
upon user selection of one or more actuators, providing corresponding feedback control signals to an automatic tire inflation device.

10. A system for providing real-time tire pressure information, the system comprising:
one or more sensors collectively configured to generate signals corresponding to each of a contained tire air temperature, a contained tire inflation pressure, and an ambient temperature associated with a tire mounted on a vehicle;
wherein at least one of the one or more sensors comprises a tire inflation pressure sensor configured to generate event-based signals corresponding to detected changes per unit pressure; and
an onboard computing device functionally linked to the one or more sensors and configured to:
determine an effective tire inflation pressure based on the generated signals and further at least on a calculated moving average of the ambient temperature; and
generate real-time notifications associated with the determined effective tire inflation pressure to a specified user interface via a communications network.

11. The system of claim 10, wherein the onboard computing device is further configured to:
determine locations of the vehicle based on output signals from a global positioning system sensor associated with the vehicle;
via at least a communications network, collect ambient temperature data corresponding with the determined locations from an online weather service; and
calculate a moving average of the ambient temperature data from the online weather service.

12. The system of claim 10, wherein:
the generated real time notifications are event-based for detected changes in the ambient temperature, contained tire air temperature, and/or contained tire inflation pressure resulting in a change to the determined effective tire inflation pressure.

13. The system of claim 10, wherein the onboard computing device is configured to generate real time feedback control signals to an automatic tire inflation device, based on the determined effective tire inflation pressure.

14. The system of claim 10, wherein:
the onboard computing device is configured to receive programming information from a remote server and/or the specified user interface, and
the programming information comprises unique identifiers for at least one of the one or more sensors, and/or a tire position of at least one of the one or more sensors, and/or a reference tire pressure.

15. The system of claim 14, wherein:
the onboard computing device is configured to compare the effective tire inflation pressure to the reference tire pressure, and to illuminate an indicator light as part of a central vehicle data collection and control system.

16. A system for providing real time tire pressure information for each of a plurality of vehicles in a managed fleet, the system comprising:
a server in operative communication via respective communications networks with a mobile user device application and/or computing devices mounted onboard the respective plurality of vehicles;
for each of the respective vehicles, one or more sensors collectively configured to generate signals corresponding to each of a contained tire air temperature, a contained tire inflation pressure, and an ambient temperature associated with a tire mounted on a vehicle;
wherein at least one of the one or more sensors comprises a tire inflation pressure sensor configured to generate event-based signals corresponding to detected changes per unit pressure; and
wherein the server is functionally linked to receive the signals from the one or more sensors and configured for each of the respective vehicles to:
determine an effective tire inflation pressure based on the generated signals and further at least on a calculated moving average of the ambient temperature; and
generate real-time notifications associated with the determined effective tire inflation pressure to a specified user interface via the respective communications network.

17. The system of claim 16, wherein:
the server is configured to generate alarms on a fleet management device linked to the server where one or more effective tire inflation pressure values exceed an allowable value and/or range.

* * * * *